United States Patent Office 3,702,305
Patented Nov. 7, 1972

3,702,305
CHEMICAL OXYGEN GENERATOR
Tommy Lewis Thompson, Melbourne, Fla., assignor to Life Support, Inc., Melbourne, Fla.
No Drawing. Continuation-in-part of application Ser. No. 66,555, Aug. 24, 1970. This application Apr. 28, 1971, Ser. No. 138,299
Int. Cl. A62b 21/00; C01b 13/02
U.S. Cl. 252—187                                                15 Claims

ABSTRACT OF THE DISCLOSURE

A chemical oxygen generator formed of an alkali metal chlorate and one or more sodium or potassium oxides. The generator can be started by igniting an ignition cone or by the addition of water to a water initiatable cone associated therewith. Thereafter, catalytic decomposition by the sodium or potassium peroxide contained therein, or formed during reaction, causes generation of substantially pure oxygen with lesser heat evolution than the previous thermal decomposition type generators of the prior art.

BACKGROUND OF THE INVENTION

This is a continuation-in-part application of Ser. No. 66,555 filed Aug. 24, 1970, now abandoned.

FIELD OF THE INVENTION

This invention relates to a chemical oxygen generator and more particularly to a "candle" formed of an alkali metal chlorate and one or more sodium or potassium oxides which, when ignited, generates copious quantities of pure oxygen to the substantial and even complete exclusion of impurities, such as chlorine, carbon dioxide, and similar undesirable and frequently toxic gases, and with less heat evolution.

DESCRIPTION OF THE PRIOR ART

Chemical oxygen generators, or "candles" formed of a chlorate and a peroxide have been known for some time. The following U.S. Patents are typical teachings of such: U.S. Pats. 2,469,414, 2,558,756, 2,775,511, 3,207,695, 3,276,846, 3,293,187. In all instances, however, they depend upon a substance such as iron, charcoal, magnesium or manganese to maintain combustion.

U.S. Pat. 2,469,414 teaches fusing a sodium chlorate-barium peroxide-carbon free powdered iron-fiberglass-wool mixture to effect a candle of increased density.

U.S. Pat. 2,558,756 enshrouds a candle of sodium chlorate-barium peroxide-iron powder-powdered glass, with a layer of potassium perchlorate to absorb the heat and to release oxygen to offset the oxygen loss due to combustion of the iron powder.

U.S. Pat. 2,775,511 encloses a candle of sodium chlorate-charcoal-manganese dioxide within a retort and absorbs undesirable $CO_2$ and $Cl_2$ in a solution of NaOH and sodium hyposulfite before the oxygen is emitted from the retort.

U.S. Pat. 3,207,695 teaches the melt casting, hot pressing or extrusion of a candle of sodium chlorate-barium peroxide-iron powder-steel fiber-potassium perchlorate, the potassium perchlorate acting to make the candle burn more uniformly.

U.S. Pat. 3,276,846 teaches a candle of an alkali metal-chlorate manganese dioxide-magnesium, in a glass fiber packed casing, the magnesium content being varied over the length of the candle in accord with the desired amount of oxygen evolution.

U.S. Pat. 3,293,187 teaches a candle of alkali metal perchlorate-manganese-a lithium oxide, the manganese and lithium oxide acting to suppress the evolution of chlorine.

As stated, the need for combustion causes an undesirable heat generation with losses of oxygen and production of chlorine, carbon monoxide and dioxide and other toxic gases which must be absorbed.

SUMMARY OF THE INVENTION

Objectives

An object of this invention is to provide a novel chemical oxygen generator.

Another object is to provide a chemical oxygen generator which relies on catalytic decomposition rather than thermal decomposition as in the past.

Still another object is to provide a chemical oxygen generator which does not require a fuel to sustain the reaction.

A further object is to provide a chemical oxygen generator which is basically a catalytic generator but may use a thermally decombustible substance to aid the reaction.

A still further object is to provide a chemical oxygen generator with a thermally decombustible substance which decomposes into a catalytic material.

Another object is to provide a chemical oxygen generator which yields a high purity oxygen.

Another object is to provide a chemical oxygen generator which has less heat evolution.

Another object is to provide a chemical oxygen generator whose heat evolution may be varied and even regulated.

Another object is to provide a chemical oxyben generator which produces even higher yields of oxygen than heretofore thought possible with alkali metal chlorate-sodium peroxide systems.

Another object is to provide a chemical oxygen generator with a high rate of oxygen generation.

Another object is to provide a chemical oxygen generator wherein the rate of oxygen generation may be varied and even regulated.

Another object is to provide a chemical oxygen generator which may be started by igniting a pyrotechnic ignition cone or by adding water to a water initiatable cone in accord with the composition of the ignition cone that is used.

Another object is to provide a chemical oxygen generator wherein the remaining ash may be reacted with water to generate even more oxygen.

Other objects of the invention will in part be obvious and will in part appear hereinafter.

BROAD STATEMENT OF THE INVENTION

It has now been found, in accord with the above objectives, that the sole use of one or more sodium or potassium oxides with an alkali metal chlorate in a chemical oxygen generator, and without fuel such as iron, charcoal, magnesium or manganese, will cause generation of purer oxygen with lesser heat evolution.

More particularly, when 99.5 to 80 parts by weight of an alkali metal chlorate, and 0.5 to 20 parts by weight of one or more sodium or potassium oxides are formed into a "candle" and ignited, a chemical oxygen generator is created with decomposition of the chlorate into purer oxygen than heretofore possible.

As indicated in the parent application, Ser. No. 66,555 filed Aug. 24, 1970, sodium peroxide acts as a catalyst. Other sodium oxides such as sodium superoxide and even the potassium oxide such as potassium peroxide, potassium superoxide act similarly. Specifically, sodium or potassium monoxide react with the chlorate or the oxygen produced by the decomposition of the chlorate to form sodium or potassium peroxide, which then acts as a catalyst. The monoxide reaction also produces heat which increases the rate of oxygen generation of the basic chlorate peroxide catalytic reaction. And it does so without introducing contaminants as would be the case if fuels, such as iron, charcoal, magnesium or manganese were used. Thus, the oxygen generated is still free of undesirable gases, such as chlorine, carbon monoxide, and dioxide as in the parent application, Ser. No. 66,555 filed Aug. 24, 1970. As before, the oxygen produced, without further treatment, meets the requirements for medically pure oxygen as described in the U.S. Pharmacopeia.

Since the rate of oxygen generation can be altered dependent upon how much monoxide is substituted for peroxide, generators can be produced which are variable with respect to (1) total oxygen generated, or (2) rates of generation, and (3) size.

Alkali metal perchlorate may be used in combination with the alkali metal chlorate especially when the monoxide is used, to surprisingly obtain even greater oxygen yield than with the purer chlorate-peroxide generator. The perchlorate is mildly exothermic, and its decomposition is not appreciably catalyzed by the peroxide, however, the monoxide provides the energy for its decomposition so that mixtures may be used.

The invention accordingly comprises the several steps and the relation of one or more of such steps with respect to each of the others, and the article possessing the features, properties, and the relation of elements, and the composition possessing the features, properties, and the relation of components, which are exemplified in the following detailed disclosure, and the scope of the invention will be indicated in the claims.

For a fuller understanding of the nature and objects of the invention, reference should be had to the following detailed examples:

DETAILED DESCRIPTION OF THE PREFERRED EMBODIMENTS

Example I

A generator composition consisting of sodium chlorate, 156.4 parts by weight (commercial grade—such as manufactured by Hooker Chemical Company of Buffalo, N.Y., treated with 1% MgO for anti-caking), and sodium peroxide, 13.6 parts by weight (Reagent grade) are dry mixed thoroughly by stirring together. Approximately 25 parts by weight of trichlorotrifluoroethane are added and the composition mixed to a consistency resembling moist sand. A portion of the mixture is then quickly (prior to complete evaporation of the trichlorotrifluoroethane) poured into a cylindrical mold cavity. The mold is closed by sliding a compression ram into the end of the mold. The mold is then placed in a hydraulic press and compressed with a force of thirty tons on the ram. The mold is then removed from the press and partially disassembled to allow placement of an ignition cone in one end of the generator.

An ignition cone composition may be as follows:

| | Primary, percent by wt. | Secondary, percent by wt. |
| --- | --- | --- |
| NaClO$_3$ | 38 | 48 |
| Fe (powder—325 mesh) | 32 | 22 |
| Si (powder) | 2 | 0 |
| BaO$_2$ | 7 | 10 |
| Asbestos | 14 | 10 |
| Steel wool | 7 | 10 |

The cone material is moistened with trichlorotrifluoroethane and compressed into the cone cavity.

Each generator is preferably compressed to a length of 3¼₃₂" to give it a dry density of approximately 2 gm./cc. After the generator is removed from the mold, it is preferably dried in an oven at 265° F. for 15 minutes to remove all trace of the trichlorotrifluoroethane.

After the generator is removed from the oven, it is cooled for 10 to 15 minutes in a forced air stream.

The ignition cone of the generator is ignited with a kitchen match and covered with a small disk of a ceramic fiber mat to prevent hot sparks from being thrown out of the cone. The generator will ignite and its decomposition reaction will proceed to completion in approximately 15 minutes.

If one of the generators are left uncovered throughout its reaction, to enable observation, it will be seen that the reaction zone actually comprises a molten layer which moves down the generator in regular fasihon. The yellow-white color of the generator will change in spotty fashion to a dark grey, nearly black appearance, sometimes showing a slight reddish tinge. After the generator ash cools, it will revert to a yellow-white appearance. The NaClO$_3$ and Na$_2$O$_2$ melt during the reaction, and a white, slightly irritating, smoke is given off. It is probably a colloidal suspension of NaCl, Na$_2$O$_2$ and NaOH, which is easily removed with glass wool filter. Since all oxygen candles generate a sodium chloride smoke, some filtration is always required. A slight odor of chlorine will also be noted during the burning of the ignition cone; however, none will be observed during the decomposition of the generator proper, indicating that the oxygen generated is probably free of chlorine. The ash from the generator will be found to dissolve completely in water with the evolution of oxygen.

By comparing the weight of generator and ash, and by measuring the volume of oxygen evolved, it will be found that the NaClO$_3$ is completely decomposed, and little, if any, of the Na$_2$O$_2$. An oxygen yield of 41.5% or 53 liters at 70° F. is generally obtained.

EXAMPLE II

Since the tendency of a generator is to absorb water vapor from the air prior to its use, the generator should preferably be sealed in an air-tight container immediately upon removal from the drying oven. The presence of water may cause the reaction to stop at some point along the length of the generator. When this is the case, a water line, or wet region, is usually clearly evident immediately preceding the reaction zone.

The following example indicates how the moisture problem can be overcome:

A generator composition consisting of:

| | Parts by wt. |
| --- | --- |
| Sodium Chlorate (Reagent grade) | 158.1 |
| Sodium Peroxide (Reagent grade) | 11.9 |
| Trichlorotrifluoroethane | 9.0 | are mixed and pressed at thirty (30) tons as in Example I; however, a larger diameter mold is used, giving a generator 1.75" diameter by 2¼" long (Density=2 gm./cc.: 42% available oxygen).

The generator is dried 18 minutes in an oven at 260° F. The generator is sealed in a housing assembly consisting of a tin-plated steel can preferably within about four minutes after removal from the oven to avoid absorption of water vapor from the atmosphere.

8.5 gm. of the following cone composition is prepared specifically for the generator:

| | Percent by wt. |
| --- | --- |
| Fe (powder–325 mesh) | 20 |
| NaClO$_3$ | 42 |
| Na$_2$O$_2$ | 8 |
| Fe$_2$O$_3$ | 14 |
| Cu$_2$O | 12 |
| Superfloss (Product of Johns-Mansville, New York, N.Y.), | 4 |

The above cone composition is slow burning and does not liquefy during ignition. It adheres well to the generator material.

An electrically igniting bridgewire (40 gauge Nichrome) with an ignition bead (approximately 0.1 gm.) is used to effect ignition of the cone. Over the bead is formed a conventional first fire zirconium/barium chromate mixture (21% Zr) (approximately 0.5 gm.) to assure complete and rapid ignition of the cone.

When current from two 12.5 volt mercury cells is applied, oxygen will usually begin flowing in less than one second from actuation. Full flow is obtained usually within five seconds. Oxygen generation will continue for approximately 11 minutes, and 30 seconds.

Other than the faint odor produced by the cone on ignition, no odor will be noted.

EXAMPLES III AND IV

A generator and ignition cone composition is formulated as in Example II, but to eliminate the odor from the cone, a layer of $Na_2O_2$ is placed at the base of the composition. The $Na_2O_2$ in the material either oxidizes or absorbs the odor.

Another generator with 30 gm. of 7% $Na_2O_2$ generator material poured loosely around the generator was also made and the odor from the cone was eliminated. The loose material also completely reacted and the duration of oxygen flow is increased to 12 minutes, 45 seconds. Uncompressed generator material will not normally sustain the decomposition reaction. A thin layer around the generator block seems to produce the best result.

In Examples II, III and IV, the tin plate on the housing in which these units were reacted was undamaged and not discolored, due to the moderately low operating temperature of the $Na_2O_2$-$NaClO_3$ generator. When conventional generators containing iron and barium peroxide were also actuated in similar housings, it was found that the tin plate badly discolors, and in some instances, the housing may actually catch fire and partially burn.

The maximum housing temperature with a sodium peroxide-sodium chlorate generator is approximately 400° F. A comparable $Fe/BaO_2/NaClO_3$ generator housing will usually have a housing temperature 100° F. higher, or approximately 500° F.

Chemical analysis of the oxygen from the $Na_2O_2$-$NaClO_3$ generators of Examples II, III and IV will show no chlorine or carbon dioxide, a trace of carbon monoxide, on the order of about one p.p.m., and from 3 to 10 mg./liter of water vapor. The water vapor depends on the water absorbed during and prior to manufacture. The carbon monoxide may be a residual from the ignition cone. With the exception of water vapor content, the oxygen produced meets the requirements for medically pure oxygen as described in the U.S. Pharmacopeia.

EXAMPLE V

The following technique illustrates manufacture of the generator without the customary press assisting fluid.

A composition consisting of:

| | Parts by wt. |
|---|---|
| Dry sodium chlorate | 93 |
| Dry sodium peroxide | 7 | are placed in a ball mill and ground until homogeneous, or until no particles of sodium peroxide are discernible. The ground powder is then pressed into a "candle" at 20,000 p.s.i. with provision in the "candle" for insertion of an ignition cone.

After insertion of the cone, the resultant generator may then be used immediately upon removal from the mold without drying in an oven as in Examples I to IV.

Upon use, no chlorine odor, other than from the ignition cone, will be noted because of the catalytic decomposition that occurs. Also, the ash will dissolve completely in water with the evolution of oxygen, as would be expected of $Na_2O_2$, in accord with the following known reaction:

$$Na_2O_2 + H_2O \rightarrow 2NaOH + 1/2O_2$$

EXAMPLE VI

This example illustrates the use of sodium monoxide solely as the catalytic ingredient.

A composition of:

| | Parts by wt. |
|---|---|
| Sodium chlorate (Reagent, ground) | 168.3 |
| Sodium monoxide (Commercial grade, ground) | 1.7 | are formed into a "candle" as in Example II. The final generator dimensions are 1.75" diameter by 2¼" long.

The generator is placed in a tin can and actuated as in Example II. The reaction will complete in about ten minutes fifty seconds. When corrected for the weight of the cone used and its oxygen yield, the body of the generator will have an oxygen yield of approximately 44.1%. The maximum theoretical from pure sodium chlorate will be 45.2% so it should be evident that an excellent yield of oxygen will be obtained. The tin can housing will not be discolored.

An analysis of the oxygen at a point six minutes into the reaction will probably be as follows:

Chlorine: 0 p.p.m.
Carbon monoxide: 0 p.p.m.
Carbon dioxide: 300 p.p.m.
Water vapor: 2.5 mg./liter
Odor: none.

With the exception of water vapor, the oxygen meets U.S.P. standards. The $H_2O$ may be removed by using a desiccant filter. Sodium monoxide is excellent for this purpose since it will form $NaOH(Na_2+H_2O\rightarrow 2NaOH)$. The water is desirable from a medical standpoint.

EXAMPLE VII

To determine the effect of sodium monoxide concentration on reaction rate, a number of generators ranging from 0 to 5% $Na_2O$ are prepared by the method of Example II and actuated in tin cans.

The generators will not sustain to completion at concentrations below 0.7% $Na_2O$. From 0.7 to 2.5%, the rate increases very rapidly according to the empirical equation:

Rate (in/min.) = 0.186 × Concentration (percent)

The reaction rate surprisingly levels out at 3% $Na_2O$ at a value of approximately 0.54 in/min. and remains at this value to 5% $Na_2O$.

EXAMPLE VIII

A number of generators are prepared in accord with the method of Example II, with concentrations up to 30% by weight of $Na_2O$ and burned in the open without a housing to determine optimum reaction conditions. It will be found that due to the large heat loss, as a result of open burning, the generators will not sustain to completion at concentrations less than 8%. It can, therefore, be concluded that containment aids the reaction.

The rate at 8% will be approximately 0.4 in./min. The plateau of 0.54 in./min. reached in Example VII is only reached at 20% $Na_2O$. Yet, this same maximum rate prevails in both the closed and open reactions. This is most noteworthy. Such attainment of a maximum rate for the closed and open reactions could be caused by the reaction temperature approaching the decomposition temperature of sodium peroxide. Therefore, it would seem that operation in the plateau region is uneconomical and concentration of sodium monoxide alone or in combination with sodium peroxide should be chosen which will operate below the plateau region.

EXAMPLE IX

Generators using mixtures of $Na_2O$ and $Na_2O_2$ are prepared which will sustain to completion at concentrations of $Na_2O$ and $Na_2O_2$ below those which will sustain if one of the oxides is used alone.

As indicated in Example VII, generators will not sustain in closed condition at values of $Na_2O$ at less than 0.7%.

Separate experimentation will also reveal that values of $Na_2O_2$ at less than 1.5% will not sustain. However, when a generator containing 0.6% $Na_2O$ and 1.0% $Na_2O_2$ is made, it reacts to completion in 9 minutes 9 seconds. Apparently, there is a synergistic effect of one upon the other with respect to sustenance of the reaction.

EXAMPLE X

Sodium chlorate-sodium monoxide generators can also be prepared by casting. In fact, they are much easier to cast than $Na_2O_2$ generators or even the iron containing generators of the prior art. The ingredients do not tend to separate for the density of $Na_2O$ appears to be nearly the same as, or perhaps slightly less than molten $NaClO_3$.

The following composition:

| | Parts by wt. |
|---|---|
| Sodium monoxide (commercial grade, granular) | 8 |
| Sodium peroxide (reagent grade, granular) | 6 |
| Sodium perchlorate (reagent grade, powder) | 1 |
| Sodium chlorate (reagent grade, powder) | 185 | is heated until a viscous slurry is obtained. A portion of said mixture is then poured into a 75 ml. nickel crucible to form a generator. A cone cavity is provided by pressing a one-inch diameter stainless steel bar into the melt before the slurry solidifies. Shrinkage of the generator on cooling separates it from the crucible. After cooling, a cone pellet having the following composition:

| | Percent by wt. |
|---|---|
| Fe (powder—325 mesh) | 25 |
| $NaClO_3$ | 39 |
| $Na_2O_2$ | 8 |
| $Fe_2O_3$ | 13 |
| $Cu_2O$ | 11 |
| Superfloss | 4 | is placed in the cone cavity.

The generator will react to completion in a tin can in approximately five minutes thirty-five seconds.

EXAMPLE XI $NaClO_3$ may be replaced by $NaClO_4$, but it is necessary to increase the amount of $Na_2O$ used, due to the lower heat of decomposition of $NaClO_4$. A typical composition is:

| | Parts by wt. |
|---|---|
| $Na_2O$ | 1.6 |
| $NaClO_4$ | 15.4 |
| $NaClO_3$ | 83 |

For a 170 gm. generator body with a 8.5 gm. cone, a reaction time of 11:14 minutes with an oxygen yield of approximately 44.1% will be obtained. The theoretical yield is 45.2%.

EXAMPLE XII

This example illustrates the use of sodium chlorate and potassium superoxide for the generator composition.

A composition of:

| | Parts by wt. |
|---|---|
| Sodium chlorate | 161.5 |
| Potassium superoxide (95% fine powder) | 8.5 | are formed into a "candle" as in Example II, but with the use of only 25 tons pressure. The final generator dimensions are 1.75″ diameter by 2¼″ long.

10.0 gms. of the following cone composition is prepared as a pellet and embedded in the generator during pressing:

| | Percent by wt. |
|---|---|
| NaI | 25 |
| $Na_2O$ | 43.3 |
| $NaClO_3$ (reagent grade) | 31.7 |

An electrically igniting bridgewire (40 gauge Nichrome) with an ignition bead (approximately 0.1 gm.) is used to effect ignition of the cone. Over the bead is formed a conventional first fire zirconium/barium chromate mixture (21% Zr) (approximately 0.5 gm.) to assure complete and rapid ignition of the cone.

When current from two 12.5 volt mercury cells is applied, oxygen will usually begin flowing in less than one second from actuation. Oxygen generation will continue for approximately 13 minutes, and 23 seconds.

Other than the faint odor produced by the cone on ignition, no odor will be noted. Also, there will be no color change as with the sodium peroxide of Example I.

An analysis of the oxygen at a point six minutes into the reaction will probably be as follows:

Chlorine: 0 p.p.m.
Carbon monoxide: 0 p.p.m.
Carbon dioxide: 100 p.p.m.
Water vapor: 5 ml./liter
Odor: none.

With the exception of water vapor, the oxygen meets U.S.P. standards. The $H_2O$ may be removed by using a desiccant filter.

The experimental yield from the generator body will be 43%, which is in excellent agreement with the calculated theoretical yield if the superoxide is unchanged in the reaction. This appears to indicate that the role of $KO_2$ is catalytic.

EXAMPLE XIII

The generator of this invention, as indicated in the preceding examples, may be initiated using ignition cones of varying pyrotechnic compositions. In this example, use of a cone comprised of the new water-initiatable composition is illustrated.

A generator having a composition similar to Example IX is prepared with a 10 gm. ignition cone consisting of:

| | Percent by wt. |
|---|---|
| KI | 25 |
| $Na_2O$ | 41 |
| $NaClO_3$ | 34 |

2.5 gm. of loose powder of the above formulation is placed on the cone and ignited with 0.1 ml. of $H_2O$ contained in a fracturable glass vial. Ignition will be rapid; the product gas analysis for the first thirty seconds of the reaction will probably be as follows:

Water vapor: 9 mg./l.
Halogens: 0 p.p.m.
CO: 5 p.p.m.
$CO_2$: 200 p.p.m.

Aside from the usual water vapor, the gas meets USP requirements.

Other water-initiatable compositions, as described in copending application, Ser. No. 138,326 filed Apr. 28, 1971, may also be used.

The oxide component of the chemical oxygen generator composition of this invention may comprise any of the sodium or potassium oxides such as sodium peroxide, sodium monoxide, potassium oxide, and potassium superoxide. Their concentration may range from 1.0 to 20 parts per 100 parts by weight. Mixtures of oxide may also be used. For example, a mixture of sodium monoxide and peroxide is especially effective when it is desired to accelerate the reaction rate of the candle. In such event, the concentration may range from 0.5 to 20 parts per 100.

The alkali metal chlorate used may comprise alkali metal chlorate and perchlorates. The preferred chlorate is sodium chlorate, although admixture with sodium perchlorate is possible. Potassium chlorate and lithium chlorate, or their perchlorates, may also be used instead of the preferred sodium chlorate or along with sodium chlorate.

In the manufacture of a candle, water-free conditions are preferred and even mandatory when $Na_2O$ or $K_2O$ is present. For water-free conditions, trichlorotrifluoroethane or other fluorocarbon may be used. The amount that can be used may be varied extensively. Five parts per 100 gms. of dry material seems to give the best results; however, a range of 2 to 10 parts may be used. If an excess is used, it will simply drain from the mold during compression. The fluorocarbon appears to serve as a mold lubricant and beneficially affects the generator structure.

Generally, water must be avoided, especially where $Na_2O$ or $K_2O$ is present. These monoxides always react vigorously with water to form their hydroxide. Where only a peroxide, such as $Na_2O_2$ is used, and if their customary decomposition by water can be overcome, such as through the use of chilled water and vacuum drying techniques, a generator having greater physical strength may be obtained even if water is used as a compression aid.

A dry compression technique, as in Example V, is also possible.

Usually, a compression technique is the most desirable. Optimum forming pressure seems to be approximately 30,000 p.s.i., although there seems to be no upper limit to the pressure which could be used. Below 10,000 p.s.i. the physical integrity of the generator is impaired and it may tend to crumble. This may be corrected with suitable binders. It is unlikely, however, that pressures less than 6000 p.s.i. can be used even with binders. The desired generator density will largely determine the pressure to be used.

Hot melt extrusion may also be employed to form the generator.

The generator may also be manufactured by casting as in Example X; i.e. melting the chlorate, mixing in the oxides and pouring the mixture into a mold. Unfortunately, as with conventional generators, difficulties are encountered with this technique when peroxide such as sodium peroxide is present. It tends to settle to the bottom of the mold. These problems can be solved in the same manner as the iron sedimentation problem discussed in U.S. Pat. 3,207,695. $NaClO_3/Na_2O$ generators are much easier to cast as the density of $Na_2O$ appears to be nearly the same as that of molten $NaClO_3$, and the problem of separation due to gravity is much less severe. Oxygen generation may also occur at the time the mixture is cast, resulting in a low density, low yield generator.

The mechanism by which the oxides catalyze the decomposition of chlorate to form pharmaceutically pure $O_2$ is not exactly known. But the following appears to be somewhat of an explanation even though the explanation is directed to the use of sodium peroxide and even though the recent use of sodium monoxide alone or in admixture with sodium peroxide has not clarified it to any greater extent.

It is known that sodium monoxide reacts with sodium chlorate or the oxygen produced by the decomposition of sodium chlorate, to form sodium peroxide, as follows:

$$Na_2O + \tfrac{1}{3} NaClO_3 \rightarrow \tfrac{1}{3} NaCl + Na_2O_2$$

or $$Na_2O + \tfrac{1}{2} O_2 \rightarrow Na_2O_2$$

and $Na_2O_2$ definitely suppresses the formation of chlorine either directly as follows:

$$Na_2O_2 + Cl_2 \rightarrow 2NaCl + O_2$$

or indirectly as follows:

$$NaClO_3 \rightarrow \tfrac{1}{2} Na_2O_2 + O_2 + \tfrac{1}{2} Cl_2$$

Since the addition of sodium peroxide by LeChatelier's principle drives the above reaction to the left, it would appear that only NaCl and $O_2$ could be produced. This apparently explains the unique pharmaceutically pure $O_2$ that is obtained by the method of this invention.

With respect to the lower temperatures induced and the fact that $Na_2O_2$ operates as a catalyst only, theoretically, the decomposition reaction for sodium chlorate is:

$$NaClO_3 \rightarrow NaCl + 1.5\ O_2 \quad \Delta H_r = -14{,}731\ \text{Cal/mole}$$

The adiabatic reaction temperature of the reaction can be calculated from the heats of formation, Perry, "Chemical Engineers' Handbook", McGraw-Hall Publishing Co., 4th Ed., pages 3–140 using the equation:

$$14{,}731 = \int_{298}^{T} C_{p-NaCl}\,dT + 1.5 \int_{298}^{T} C_{p-O_2}\,dT$$

where T is the adiabatic reaction temperature in °K., $C_p$ is the heat capacity, cal/° C. (gm.-mole).

Using the following $C_p$ values from pages 3–119 and 3–121 of Perry, supra:

$C_{p-NaCl} = 10.79 + 42 \times 10^{-4}\ T$
$C_{p-O_2} = 8.27 + 2.58 \times 10^{-4}\ T - 18.77 \times 10^4/T^2$ the adiabatic reaction temperature calculates to be 891° K. or 618° C. Thus, the heat produced out of the reaction will amount only to 552 Btu./lb.$O_2$. In contrast, thermal decomposition generators produce approximately 900 Btu./lb.$O_2$, Haug, "Improved Chlorate Candle Provides Concentrated Oxygen Source," NASA Tech. Brief 67–10095, Supplemental Information, Houston, Tex., 1967.

From Ellern, "Military and Civilian Pyrotechnics," Chem. Publishing Co., (1968), p. 299, which gives the decomposition temperature of sodium chlorate as 350° C., it becomes apparent that the heat release by the decomposition of sodium chlorate itself is sufficient to maintain a self-sustaining reaction without the use of fuel, provided heat loss is kept to a reasonable limit. Although various sources give differing values, sodium peroxide has a decomposition temperature of about 919° K., which is above the reaction temperature calculated above. So its role as a catalyst appears to be confirmed.

With respect to use of sodium monoxide, as discussed above, it either reacts with the alkali metal chlorate or with the oxygen produced by the decomposition of the chlorate. In both instances, sodium peroxide is formed which then acts as the catalyst in the catalytic decomposition of the alkali metal chlorate. These reactions of $Na_2O$ may be represented as follows:

$Na_2O + \tfrac{1}{3} NaClO_3 \rightarrow \tfrac{1}{3} NaCl + Na_2O_2 \quad \Delta H_r = -24{,}670$ Cal/mole $Na_2O + \tfrac{1}{2} O_2 \rightarrow Na_2O_2 \quad \Delta H_r = -19{,}750$ Cal/mole Since these reactions are exothermic, they supply heat and as should be evident from the examples above, particularly Examples VII to XI, dependent upon the amount used with sodium peroxide, the rate of oxygen generation may be increased from that by $Na_2O_2$ alone or varied or even regulated in accord with the ratios of $Na_2O_2$ and $Na_2O$ utilized. Thus, generators having smaller or the same physical dimensions may be made which produce oxygen at equal, or greater, rates than heretofore.

It will thus be seen that the objects set forth above, among those made apparent from the preceding description, are efficiently attained, and, since certain changes may be made in carrying out the above method and in the compounds set forth without departing from the scope of the invention, it is intended that all matter contained in the above description shall be interpreted as illustrative and not in a limiting sense.

Now that the invention has been described, what is claimed is:

1. An oxygen generating composition which when ignited generates oxygen consisting essentially of a major proportion of an alkali metal chlorate and a sufficient amount of an oxide selected from the group consisting of oxides of sodium and potassium and mixtures thereof to maintain a self-sustaining catalytic decomposition reaction liberating oxygen without additional heat or any added fuel material.

2. The composition of claim 1 wherein said oxide comprises 1.0 to 20% by weight of sodium peroxide.

3. The composition of claim 1 wherein said oxide comprises 0.5 to 20% by weight of a mixture of sodium monoxide and sodium peroxide.

4. The composition of claim 1 wherein said chlorate comprises sodium chlorate.

5. The composition of claim 1 containing up to about 15% by weight of alkali metal perchlorate.

6. The composition of claim 1 having, in addition, an ignition material to initiate the catalytic decomposition of said generator composition.

7. The composition of claim 6 wherein said ignition material consists of a water initiatable composition.

8. The method of producing substantially pure oxygen which comprises igniting a mixture of a major proportion of an alkali metal chlorate and a sufficient amount of an oxide active catalytic agent selected from the group consisting of oxides of sodium and potassium and mixtures thereof to maintain a self-sustaining catalytic decomposition reaction liberating oxygen without additional heat or any added fuel material.

9. The method of claim 8 wherein sodium monoxide is the active catalytic agent.

10. The method of claim 8 wherein the active catalytic agent is a mixture of sodium peroxide and sodium monoxide.

11. The method of claim 8 wherein the chlorate is sodium chlorate.

12. The method of claim 10 wherein the rate of oxygen liberation is increased by increasing the sodium monoxide content of the oxide.

13. An oxygen generating composition which when ignited generates oxygen by catalytic decomposition at relatively low temperatures consisting essentially of an alkali metal chlorate as the active oxygen source, and an oxide selected from the group consisting of oxides of sodium and potassium and mixtures thereof as the active decomposition catalyst for the alkali metal chlorate, said chlorate and oxide being compressed together to form a candle, an ignition material on an end of the candle, and said oxide being present in sufficient amount to maintain, when said candle is ignited by said ignition material, a self-sustaining catalytic decomposition reaction liberating oxygen without additional heat or added fuel material.

14. The composition of claim 13 wherein said oxide is selected from the group consisting of sodium peroxide, sodium monoxide, and mixtures thereof, is present in sufficient quantities to sustain catalytic decomposition of substantially all of the chlorate and the ignition material is a water initiatable composition.

15. The method of producing substantially pure oxygen at relatively low temperatures which comprises igniting a candle composed of a compressed mixture of an alkali metal chlorate and a sufficient amount of an oxide selected from the group consisting of oxides of sodium and potassium and mixtures thereof in sufficient amounts to effect catalytic decomposition of substantially all of the chlorate without additional heat or added fuel material.

References Cited

UNITED STATES PATENTS

| | | | |
|---|---|---|---|
| 2,469,414 | 5/1949 | Schechter | 252—187 |
| 2,558,756 | 7/1951 | Jackson et al. | 23—281 |
| 2,775,511 | 12/1956 | Geffroy et al. | 23—281 |
| 3,089,855 | 5/1963 | Hovard | 252—186 |
| 3,174,936 | 3/1965 | Gustafson et al. | 252—186 |
| 3,207,695 | 9/1965 | Gustafson | 252—186 |
| 3,293,187 | 12/1966 | Markowitz | 252—186 |

FOREIGN PATENTS

| | | | |
|---|---|---|---|
| 213,686 | 8/1906 | Germany | 252—186 |

HERBERT B. GUYNN, Primary Examiner

I. GLUCK, Assistant Examiner

U.S. Cl. X.R.

23—2 C, 281; 252—186

UNITED STATES PATENT OFFICE
CERTIFICATE OF CORRECTION

Patent No. 3,702,305   Dated November 7, 1972

Inventor(s) Tommy Lewis Thompson

It is certified that error appears in the above-identified patent and that said Letters Patent are hereby corrected as shown below:

Column 2, line 31, change "oxyben" to --oxygen--.
Column 6, line 32, change "$NaOH(Na_2+H_2O \rightarrow 2NaOH)$" to --$NaOH(Na_2O+H_2O \rightarrow 2NaOH)$--.
Column 12, line 28, change "Hovard" to --Bovard--.

Signed and sealed this 10th day of April 1973.

(SEAL)
Attest:

EDWARD M. FLETCHER, JR.
Attesting Officer

ROBERT GOTTSCHALK
Commissioner of Patents